United States Patent
Whitfield

(10) Patent No.: US 7,310,772 B2
(45) Date of Patent: Dec. 18, 2007

(54) LINKING METHOD FOR PRINTED TELEPHONE NUMBERS IDENTIFIED BY A NON-INDICIA GRAPHIC DELIMITER

(75) Inventor: Henry Whitfield, 2490 Agnes Way, Palo Alto, CA (US) 94303

(73) Assignee: Henry Whitfield, Palo Alto, CA (US)

( * ) Notice: Subject to any disclaimer, the term of this patent is extended or adjusted under 35 U.S.C. 154(b) by 290 days.

(21) Appl. No.: 10/973,786

(22) Filed: Oct. 25, 2004

(65) Prior Publication Data

US 2005/0091282 A1   Apr. 28, 2005

Related U.S. Application Data

(60) Provisional application No. 60/514,435, filed on Oct. 24, 2003.

(51) Int. Cl.
*G06F 17/21* (2006.01)
*G06F 17/24* (2006.01)

(52) U.S. Cl. ............ 715/528; 715/526; 715/529; 715/705; 709/218

(58) Field of Classification Search ............ 715/526, 715/705, 520, 528, 529; 709/206, 217, 218
See application file for complete search history.

(56) References Cited

U.S. PATENT DOCUMENTS

| | | | |
|---|---|---|---|
| 5,812,776 A | 9/1998 | Gifford | |
| 6,353,852 B1 * | 3/2002 | Nestoriak et al. | 709/206 |
| 6,516,311 B1 | 2/2003 | Yacoby | |
| 6,769,018 B2 | 7/2004 | Gagnon | |
| 6,788,769 B1 | 9/2004 | Waites | |
| 6,789,078 B2 * | 9/2004 | Saitou et al. | 707/10 |
| 6,999,444 B1 * | 2/2006 | Nitta et al. | 370/338 |
| 2002/0087892 A1 * | 7/2002 | Imazu | 713/202 |
| 2004/0107267 A1 * | 6/2004 | Donker et al. | 709/218 |

* cited by examiner

*Primary Examiner*—Stephen Hong
*Assistant Examiner*—Joshua D Campbell
(74) *Attorney, Agent, or Firm*—Michael A. Glenn; Glenn Patent Group

(57) ABSTRACT

The invention comprises a graphic designation method for visually differentiating each number individually for a set of telephone numbers within a printed telephone directory. In a particular instance, the invention is applied in cases in which each said telephone number in the set has been established as a link element for linking to online digital resources associated with said telephone number. The invention also teaches a method for establishing a printed telephone number directory simultaneously as a directory for a telephone number directory service. The invention also teaches a method for displaying instructions for Internet addressing within a printed directory.

8 Claims, 3 Drawing Sheets

LINKING METHOD FOR PRINTED TELEPHONE NUMBERS IDENTIFIED BY A NON-INDICIA GRAPHIC DELIMITER

CROSS REFERENCE TO RELATED APPLICATIONS

This application claims priority to U.S. provisional patent application Ser. No. 60/514,435, filed Oct. 24, 2003, all of which is incorporated herein in entirety by this reference thereto.

BACKGROUND OF THE INVENTION

1. Field of the Invention

The invention relates generally to methods for locating and accessing Internet resources and to methods for linking offline advertising, directory listings, and other published information to associated Internet resources, particularly in instances where a linking element comprises a telephone number. As well, the invention relates to graphic display methods as applied in printed publications and in associated replica interactive versions of printed publications which may be made available as Internet resources or in multimedia formats, such as CD-ROM and DVD disks.

2. Discussion of Related Art

Rapid adoption of the Internet for commerce has provided an electronically connected venue of networked computers ideally suited to support many types of commerce. Fundamental Internet technology is well understood by people schooled in the field and need not be further elaborated.

To exploit the commercial opportunities of this electronic venue, businesses and other entities have created a vast networked array of publicly accessible digital resources encompassing data formats for text, graphics, audio, and video. Further, a system of standards has been established and is enforced within the network to insure homogeneity in the various electronic processes and data interchange methods that are possible between Internet-connected devices.

The hypertext linking and addressing protocol facilitates one process whereby any client computer connected to the Internet may directly request and have returned any resource that is accessible from any resource server computer within the network. One requirement of the hypertext protocol is that there is a discrete relationship between one URL and one associated available resource, and this one-to-one relationship is necessary to enforce within the totality of all computers connected to the Internet. A network of registries has been established to enforce this requirement as new resources are created. Thus, creators of new web resources such as web sites often have difficulty, as a practical matter, in finding a unique character sequence not previously assigned which can be used as sub-domain reference.

From a commercial perspective, it is generally held that the subdomain URL, or domain name selected to identify a company's top-level domain, or home page, can influence a company's level of success in its efforts to exploit the commercial opportunities afforded by the Internet. For example, URL's with fewer characters and those with memorable word associations are generally held to be more desirable because they are more apt to be remembered by prospective customers, and are easier to enter into a browser address box. Given the sheer volume of individual resources that have already been assigned URLs, creators of new web resources now typically find it is increasingly difficult to secure URLs that meet these criteria.

As well, many resource URL assignments are established via automatic programmed processes within a resource server computer without regard to semantic association with spoken language, length, or other considerations. Typically, these automatic processes result in the creation of lengthy nonsensical URL character strings with multiple pathname layers that are extremely difficult for a client user to enter into browser address field by manual means using a keyboard.

To address this problem, various methods of simplified addressing have been introduced which enable a simplified alias URL to be established and associated with an actual URL. Typically, these methods make it possible to request an internet resource on the basis of an associated telephone number, zip code, email address, and on the basis of association with other alphanumeric coding schemes.

Relative to the invention herein, Gifford (U.S. Pat. No. 5,812,776) anticipated the desirability of simplified references to web resources and teaches a method enabling client systems to locate Internet resources with simplified addressing based on telephone numbers. Gifford implies the method could be used as the basis to enable a service.

In Gifford, a client system sends a first resource request comprising a phone number element to an intermediary redirection server system holding a translation database of telephone numbers mapped to corresponding Internet resources. Using the translation database, the intermediary system uses the phone number element of the received request to determine the associated URL, which is returned to the client system and used by the client system in a second resource request to locate the actual resource.

Successful resolution of a telephone number-based resource request using the method requires the receiver system to be in receipt of a client system resource request, and that said resource request include at least one pathname element comprising a phone number, typically written as www.subdomainofreceivingserver/phonenumber. By implication this imposes a requirement that a client user system, either by client user manual entry or by some other means, must be provided with both the subdomain address of the computer which is to receive the resource request and the telephone number associated with the actual requested resource.

To satisfy this requirement, Gifford in a first method implies the possibility (see column 6, line 4) of an acceptable manual entry method whereby a client user enters a conforming URL request in a conventional browser address entry box. This first method, in turn, implies a requirement that the client user must have knowledge of the subdomain address of the receiver server that is to receive the resource request, the telephone number that is associated with the resource, and also knowledge of how to format a conforming resource request. Gifford also teaches in a preferred embodiment a second method (see column 7, line 50) which implies a modified browser which can be caused by a client user to generate a conforming URL request to a specified receiver server upon manual entry by the user of only a phone number element into a modified address entry box, though further details are not provided. Gifford also teaches a third method (see column 7, line 60) in which a client user is first provided access by a directory server to a form page, and through implication teaches that a user may enter only a phone number element into a prompt box on the form page which by some means causes a conforming URL request to be received by the designated receiver server.

This first method of Gifford, while imposing additional knowledge requirements on a client user, is nonetheless in practice preferred, as this method most conforms to current client user practice, does not require a user to download and install special browser software, and does not consistently require a client user to perform the intermediary step of locating and requesting a separate forms page. Because this method imposes the additional knowledge requirements upon the client user as discussed above, two additional requirements are therefore introduced by implication that must be satisfied to insure widespread adoption of telephone number-based Internet addressing. The first requirement is that there must be in place a simple means readily and widely available to prospective client users for determining which telephone numbers have been registered with a designated receiving server system. The second requirement being that instructions for using the service must be readily available to a prospective client user, which would include the subdomain address of the receiver server which is to receive the resource.

Printed telephone number directories are ideally suited as a means to make available this information, if properly enabled for this purpose. Telephone directory publishing is a well-developed art, and published directories are now constructed on the basis of much cumulative research on how to organize telephone-listing data for optimal utility. They are also widely distributed and available on a vast scale. In the U.S., over 600,000,000 individual copies of 7,500 different directories are distributed annually. Printed directories are virtually ubiquitous and consulted frequently by all strata of society, which is another reason these directories are ideally suited as a means to speed market acceptance for telephone-number Internet addressing.

Further, the telephone directory publishing business has become increasingly competitive due to proliferation and fragmentation of local media, and most recently by Internet competitors, such as search engines and web portal sites which are seeking to attract advertising revenue from local advertisers. As well, usage of directories by the general public is no longer growing as some people have begun to migrate to online sources. As well, the base of businesses using telephone directory advertising has also been negatively affected by business consolidation and other factors.

Telephone directory publishers therefore need and are seeking ways to enhance the value of their directories to attract advertisers, and also ways to make telephone directories more useful to the general public, thereby increasing usage. By establishing an advertising charge to designate numbers that have been registered for Internet addressing, publishers are afforded a significant new revenue opportunity that also has the advantage of making a directory more valuable to both its users and advertisers.

Particularly relevant to the invention herein, directory publishers have recently begun offering advertisers the opportunity to include their homepage URL in an expanded listing format for a fee. In directories that have implemented this format, the URL line typically appears on an additional line, typically immediately under the lines containing the traditional name, address, and telephone number information. In some directories, the URL information is displayed in a color shade that is different from the color used to display the name, address, and telephone number information. In these instances, the differentiated color is not used to designate that the telephone number itself has been established to serve as linking element to online resources in a network, but serves the purpose of attracting increased reader attention to the included URL information.

This offering has had some limited success in attracting paying advertisers, but has several drawbacks for publishers. A first drawback is that the providing of an extra line to accommodate the addition of URL listings, if provided in volume, would significantly increase publisher costs for paper, ink, printing, and shipping. A second drawback is that this method necessitates a thicker directory, which published research has shown to affect customer usage. A third drawback is that many URL's are simply too lengthy to fit within the space of a typical directory layout. Thus, many potential advertising customers are automatically excluded as sales prospects. A fourth drawback is that URL's, especially those established as homepage URLs for smaller businesses, are highly subject to frequent modification, yet directories are updated only once a year. Telephone number-based addressing may provide a means for an advertiser to reassign the URL that is associated with his telephone number at any time, so the directory is more apt to remain current. For these and other reasons, it is in the interest of publishers to open their directories to serve as directories for telephone-number based Internet addressing.

Another drawback relates to the production of facsimile versions of printed directories which publishers may make available as Internet resources, or in interactive multimedia versions, which may be distributed in CD-ROMs or by other means. In some forms of these multimedia versions, URL's which appear in the printed version of the directory are enabled as an active hypertext link, such that a user who is connected to the Internet may click on said URL link and thus call up the associated website. However, production of this multimedia using this method creates difficulties in the production process as follows. To enable the active hypertext link with a URL, a computer application is used that accesses the URL from the record database that was used to print the printed version of the directory. For each directory listing in which a URL is to be enabled as a hypertext link, a special software tool, typically custom programmed, is used to extract the URL from the database, and in conjunction with a graphics application, automatically apply a graphic to the multimedia version of the URL which in the distributed multimedia version, indicates to users that the URL information is a clickable live link. However, variability in the length of URLs complicates this process significantly because it is difficult to program this application of the graphic to be fully automatic, and typically graphics must be manually applied using other software tools. This adds significant labor expense to the process of enabling live URL links in the multimedia replica versions. By implementing telephone-number based Internet addressing in telephone directories, the telephone number may be enabled as a hypertext link, and because of higher consistency in the number of characters typically occurring in phone numbers within a directory, the multimedia production process is simplified, thus, lowering cost.

The opportunity to use telephone directories as directories for telephone-number based addressing was first tried in 2001 by the Internet Number Corporation (INC) of Tokyo, Japan, which established a service to provide telephone-based Internet addressing based on the Gifford method, and conducted a test program in conjunction with Yellow Page publisher NDC Yellow in 2001. The implementation by NDC/INC failed to win marketplace adoption and is no longer offered. This implementation was deficient in at least three ways, and it is an object of the invention herein to correct the deficiencies and teach an improved method of implementing telephone-number based Internet addressing within a printed telephone directory.

The first deficiency in the NDC/INC implementation was that although a graphic method was used within the directory to designate which numbers had been registered for telephone-number based Internet addressing, the method used was completely ineffective. A small graphic logo appeared in the same color ink as that which was used for the balance of the textual information in the number listing that was placed adjacently in proximity to the telephone number. This graphic designation method failed in practice to provide adequate visual differentiation between registered numbers and unregistered numbers. A second deficiency was that the insertion of the graphic indicia within a line of text caused variable registration and wraparound problems, which complicated the production process. A third deficiency was that NDC/INC did not provide instructions for Gifford's first method of manual entry method whereby a client user constructs a conforming URL request written as www.subdomainofreceivingserver/phonenumber in the format in a conventional browser address entry box. Thus, a prospective user either had to download special browser plug-in software, or use a provided URL of a forms page, where a phone number could be entered and sent to the telephone number-based addressing service server.

A need therefore exists for an improved method for implementing telephone number-based Internet addressing using printed telephone directories as directories, in particular in a method that would make readily available to prospective users the instructions for how to construct a conforming URL request, which would include the subdomain address of the telephone number-based addressing service receiver server which is to receive a conforming URL sent by a client system. A need also exists for an improved graphic method for designating telephone numbers within a printed directory, which numbers have been registered with a telephone-number based Internet addressing service and in associated replica multimedia versions. A need also exists to have said method such that it does not contribute to registration and wraparound problems in the printing process. A need also exists to for a method of enabling live hypertext links within multimedia replica versions of printed versions that better facilitate the use of software tools in the application of graphics in a multimedia version.

SUMMARY OF THE INVENTION

The invention comprises a graphic designation method for visually differentiating each number individually for a set of telephone numbers within a printed telephone directory. In a particular instance, the invention is applied in cases in which each said telephone number in the set has been established as a link element for linking to online digital resources associated with said telephone number.

The invention also teaches a method for establishing a printed telephone number directory simultaneously as a directory for a telephone number directory service.

The invention also teaches a method for displaying instructions for Internet addressing within a printed directory.

DETAILED DESCRIPTION OF THE INVENTION

Figure 1:
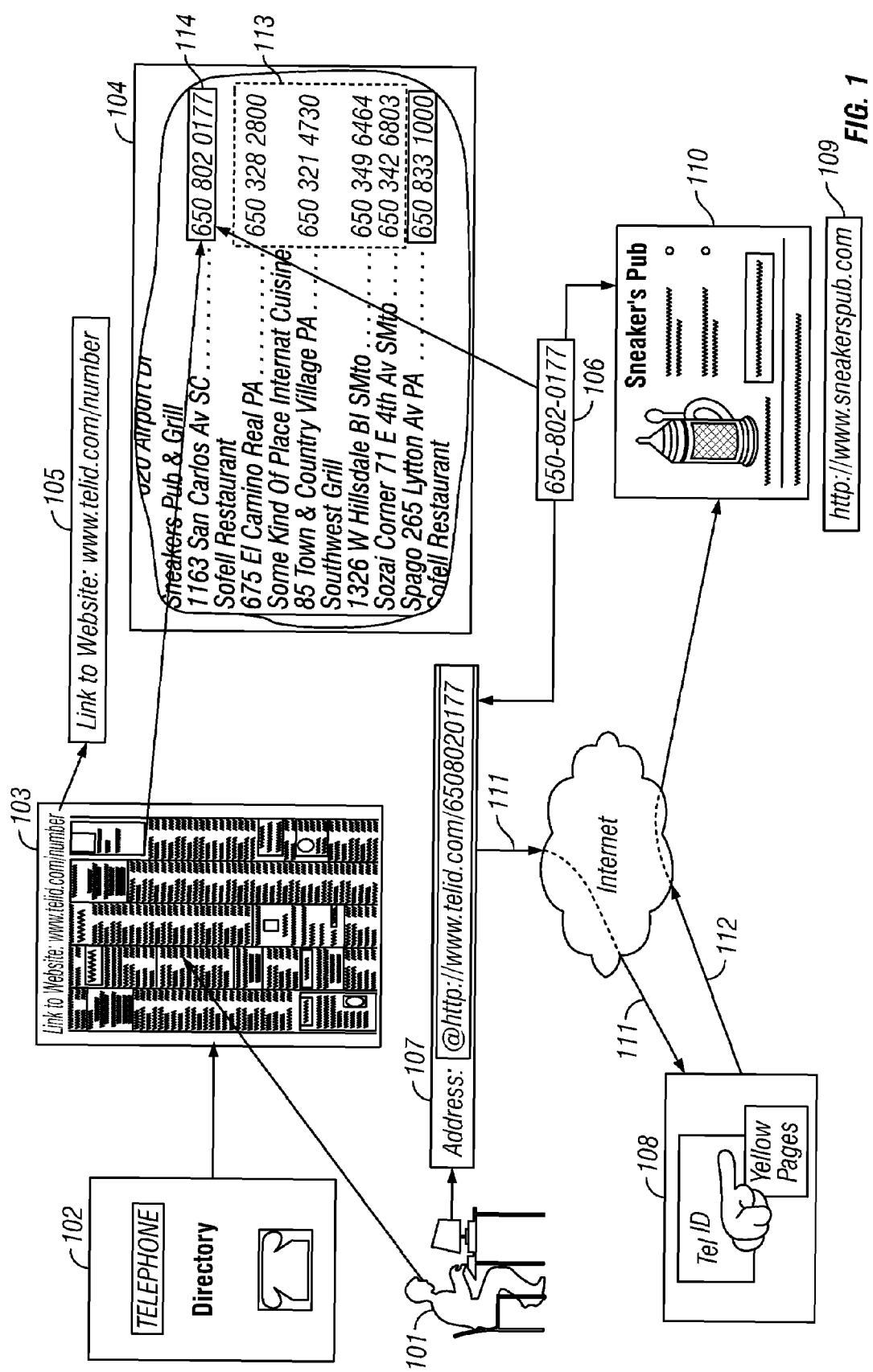
FIG. 1 is a block schematic diagram showing an overview of a preferred embodiment of the invention as applied to a telephone directory.

In the preferred embodiment shown in FIG. 1, a telephone number based-Internet addressing service 108 is established. The service is comprised at a minimum of an Internet-connected receiving server at the service having a subdomain address, e.g. www.subdomain, and a translation database comprised of a set of first telephone number elements 106. Each telephone number element is in one-to-one correspondence with a second element comprised of an actual URL element 109. The URL element is associated with a predetermined Internet resource 110. A telephone number is established as an entry in a service translation database. The telephone number is also mapped within a translation database to an associated predetermined URL element that is deemed as having been registered with the service. Multiple URL elements may be associated with a telephone number element.

A printed telephone directory 102 is established containing printed listings 103, in which one or more listings comprise registered telephone number elements 114. A set of registered telephone number elements within the directory are visually differentiated uniformly within the directory by use of an enforced graphic designation method which is uniquely applied to each of the registered numbers within the set. A directory may contain at a minimum an alternate set of registered phone number elements, if the alternate registered set is established as registered with a different service, and provided that no registered number element is contained in multiple registered sets within the same directory.

Adapted versions of the printed directory containing any replica portion of the printed directory, which adapted versions may have been established as Internet resources and as multimedia versions on CD-ROMs and DVD-ROMs, may also be used.

It is enforced that at least one instruction element 105 be displayed within the directory which contains at a minimum an example alias URL in the format www.subdomain/exampletelephonenumber, where the www.subdomain portion is the URL of the service receiving server and the exampletelephonenumber pathname portion is an example of a registered telephone number element. It is preferred that the instruction element is displayed on multiple pages within the printed directory, as shown for example, at top of example directory page 103.

Figure 2:
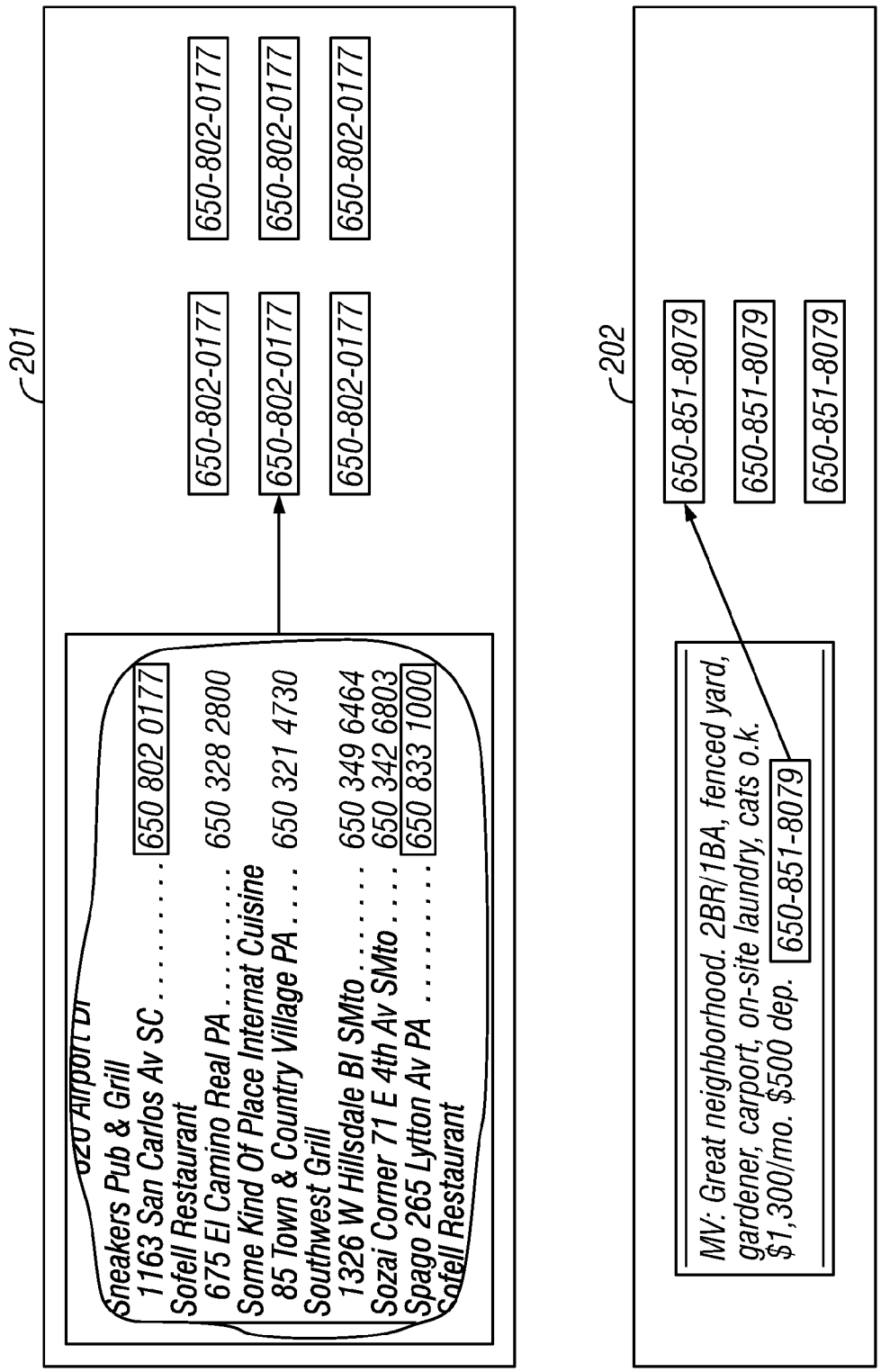
FIG. 2 is a block schematic diagram that shows variants of a graphic method used to differentiate printed telephone numbers, as implemented in a printed telephone directory, and separately in a newspaper classified advertisement, in accordance with the invention.

The enforced graphic designation method is applied uniformly to each registered number within a set of registered numbers. The graphic designation requires at least one permitted graphic treatment 201 to be applied to each registered number within a set of registered numbers. The graphic treatment must be applied with a generally rectangular shaped area that extends slightly around and aligned vertically and horizontally with the generally rectangular area bounding a registered number within the set. Also enforced is that said graphic treatment must be a permitted graphic treatment. Multiple permitted graphic treatments may be applied if applied uniformly to all registered numbers within a set. Multiple permitted graphic treatment are available as shown in FIG. 2, which may include a registered telephone number being displayed in bold type face in any color; the registered telephone number being displayed in plain type face type in any color; the slightly extended generally rectangular area being displayed as outlined in any color; and the extended generally rectangular area being displayed as shaded using any halftone shade of any color.

A client user consults a directory 102 to find a listing 114 differentiated on basis of graphic designation method that contains a registered telephone number element.

Figure 3:
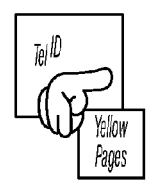
FIG. 3 shows a page from a white page business listings section of a printed telephone directory illustrating visually differentiated registered telephone number elements in accordance with the invention.

FIG. 3 illustrates a directory page in which the herein disclosed method is implemented.

In a combination step (see FIG. 1), the client user combines a found telephone number element with the service receiving server URL element extracted from instruction element to construct an alias resource request 107 in the format www.subdomain/telephonenumberelement, where the www.subdomain portion is the service receiving server URL extracted from instruction element and the telephone-numberelement pathname portion is the found registered telephone number element. The client user enters the constructed alias URL into an Internet browser address field on an Internet-connected client system. Access is made 111 via a simultaneous Internet connection to the connected service-receiving server 108. The pathname portion may include multiple pathname directory levels as long as at least one, and only one pathname directory level includes a phone number element. A parsing means may be integrated into receiving server system to extract the telephone number element to accommodate use of variant entry formats of the telephone number element. A programmed means may be provided, such that registered number elements comprising different country codes may be registered with and be recognized by service. Another means may be provided so that multiple country codes may be accommodated by the service enforcing that a unique receiving server with a unique subdomain address must be assigned only to receive alias URL's constructed of a set of phone number element, all of which are contained within a set of telephone numbers within one country code.

Service receiving server at 108 receives an alias resource request from the client system and extracts the telephone number element in a service translation process at 108. The service translation process uses a translation database in a connecting process to connect the client system with a predetermined Internet resource. Both the service translation process and the connecting process at 108 may be by means of method taught by Gifford, or by some other method.

Number registrations may be promoted by directory publishers, newspaper publishers, other authorized publishers of printed media, and others. A means may be provided such that publishers, newspaper publishers, domain registrars, and others may be established as registrars for the service. A means may be provided such that a portion of established registrars may have direct connected access to the service server system and a means to create and modify new registrant entries. Registrars may charge a registration fee to registrants.

An authorization means may be provided for verifying that an entity requesting a registration is the bona fide owner of a telephone number being registered, such that only a bona fide owner entity of a telephone number may be allowed to register a telephone number with service. A telephone directory publisher may have means to authorize a registrant, and also a newspaper publisher, and others. Other authorization methods may be required to insure that a requesting entity registrant is a bona fide owner of a telephone number being registered. One such means is to require that a registrant call the service registry system from the telephone number being registered as verification of that telephone number.

A more elaborate means may include a first step of a prospective registrant registering at a service registration web page and entering at least a registrant telephone number and email address, a second step of a service sending email to a registrant email address which includes a service telephone number and at least a one-use password uniquely assigned to said user, a third step of a registrant calling the telephone number provided in the email, a fourth step of the service answering the registrant call and prompting the user to enter a password, and a final step of the user entering a password received in a service email.

The service may also provide the registrant with means to access a web page and view reports quantifying linking activity associated with registrant's registered number. The registrant may also be provided with a means to log into a web page and directly modify a predetermined URL associated with a registrant telephone number.

A parsing means may also be provided, such that the format of the telephone number informational element may vary in format. A means may be provided such that an international telephone number is used by a client searcher as the telephone number informational element. A means may be provided such that if there is duplication between one or more international telephone numbers and a local number, multiple website links are displayed to the searcher, such that a client searcher could select a correct link.

The service may provide a checking means such that registered predesignated URLs are periodically verified as valid active links, and further means may be provided such that a registrant and, as well the registrar of a registrant, may be automatically notified by email and other means upon a predesignated ULR becoming an inactive link, e.g. as discovered though a testing process.

In an alternate embodiment, the method may be to applied classified sections of newspapers, as illustrated by the drawing element 202.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A telephone number based Internet addressing service comprised of an Internet connected receiving server at said service having an Internet domain and a translation database comprised of a set of first telephone number elements, said service comprising:

each said telephone number element is in one-to-one correspondence with a second element comprised of a URL element;

wherein said URL element is associated with a predetermined Internet resource;

wherein said telephone number elements comprise at least one telephone each number that is established as an entry in said service translation database;

and wherein said telephone number is also mapped within said translation database to an associated predetermined URL element that is deemed as having been registered with said service; and a printed telephone directory containing printed listings, in which at least one listing comprises said registered telephone number elements;

wherein a set of registered telephone number elements within said directory is visually differentiated uniformly within said set by an enforced graphic designation mechanism which is uniquely applied to registered numbers within said set; and wherein a client user consults said directory to find a listing that contains a registered telephone number element, where said listing is differentiated by said graphic designation mechanism;

wherein said enforced graphic designation mechanism is applied uniformly to each registered number within a set of registered numbers;

wherein said graphic designation requires at least one permitted graphic treatment to be applied to each registered number within a set of registered numbers;

wherein said graphic treatment is applied with a rectangular shaped area that extends slightly around and aligned vertically and horizontally with a rectangular area bounding a registered number within the set;

wherein a client user combines a found telephone number element with a service receiving server URL element extracted from an instruction element to construct an alias resource request in the format www.subdomain/telephonenumberelement, where the www.subdomain portion is a service receiving server URL extracted from said instruction element and the telephonenumberelement pathname portion is a found registered telephone number element;

wherein said pathname portion may include multiple pathname directory levels as long as at least one, and only one pathname directory level includes a phone number element;

wherein said client user enters said constructed alias resource request into an Internet browser address field on an Internet-connected client system; and wherein access is made via a simultaneous Internet connection to said connected service-receiving server;

parsing means integrated into said receiving server system to extract said telephone number element to accommodate use of variant entry formats of said telephone number element;

programmed means, wherein registered number elements comprising different country codes may be registered with and be recognized by said service;

means by which multiple country codes are accommodated by said service enforcing that a unique receiving server with a unique subdomain address must be assigned only to receive alias URL's constructed of a set of phone number elements, all of which are contained within a set of telephone numbers within one country code;

authorization means for verifying that an entity requesting a registration is a bona fide owner of a telephone number being registered;

wherein only a bona fide owner entity of a telephone number is allowed to register a telephone number with said service;

means for requiring a registrant to call a service registry system from a telephone number being registered as verification of that telephone number;

means for a prospective registrant registering at a service registration web page and entering at least a registrant telephone number and an email address;

wherein said service sends email to a registrant email address which comprises a service telephone number and at least a one-use password uniquely assigned to said user;

wherein a registrant calls said telephone number provided in said email;

wherein said service answers said registrant call and prompts said user to enter a password; and wherein said user enters a password received in a service email.

2. The service of claim 1, wherein multiple URL elements may be associated with a telephone number element.

3. The service of claim 1, wherein said directory comprises an alternate set of registered phone number elements, if said alternate registered set is established as registered with a different service, and provided that no registered number element is contained in multiple registered sets within a same directory.

4. The service of claim 1, wherein said directory comprises:

an adapted version of said printed directory containing any replica portion of said printed directory.

5. The service of claim 1, wherein at least one instruction element is displayed within said directory, said instruction element comprising an example alias URL in the format www.subdomain/exampletelephonenumber, where the www.subdomain portion is a URL of a service receiving server and the exampletelephonenumber pathname portion is an example of a registered telephone number element.

6. The service of claim 5, wherein said instruction element is displayed on multiple pages within said printed directory.

7. The service of claim 1, wherein multiple permitted graphic treatments may be applied if applied uniformly to all registered numbers within a set;

wherein said multiple permitted graphic treatments comprise any of a registered telephone number being displayed in bold type face in any color; said registered telephone number being displayed in plain type face type in any color; a slightly extended generally rectangular area being displayed as outlined in any color; and an extended generally rectangular area being displayed as shaded using any halftone shade of any color.

8. The service of claim 1, further comprising:

a checking means wherein registered pre-designated URLs are periodically verified as valid active links.

* * * * *